United States Patent [19]

Kumagai et al.

[11] 4,142,228
[45] Feb. 27, 1979

[54] VEHICLE LAMP CASING OPTICAL AXIS ADJUSTING MECHANISM

[75] Inventors: Kimio Kumagai, Isehara; Masao Ishikawa, Yokohama, both of Japan

[73] Assignees: Nissan Motor Company, Limited, Yokohama; Ichikoh Industries Limited, Tokyo, both of Japan

[21] Appl. No.: 799,789

[22] Filed: May 23, 1977

[30] Foreign Application Priority Data

May 24, 1976 [JP] Japan .................................. 51-65273

[51] Int. Cl.² ............................................. B60Q 1/06
[52] U.S. Cl. .................................. 362/233; 362/420; 362/428; 362/66
[58] Field of Search ..................... 362/40, 66, 68, 70, 362/233, 420, 424, 428, 427, 421, 225

[56] References Cited

U.S. PATENT DOCUMENTS

| 1,199,930 | 10/1916 | Schoolfield | 362/428 |
| 1,307,758 | 1/1919 | Sandstedt | 362/428 |
| 3,229,082 | 1/1966 | Barron | 362/233 |
| 3,621,230 | 11/1971 | Dwight | 362/428 |

FOREIGN PATENT DOCUMENTS 914586 5/1954 Fed. Rep. of Germany.
683103 6/1930 France.

Primary Examiner—William M. Shoop
Assistant Examiner—Peter S. Wong

[57] ABSTRACT

An operating wire directly and operatively connected to a lamp casing for swingingly moving same by linear movement of the operating wire and a pulley for converting the direction of linear movement of the operating wire to the direction of swinging movement of the lamp casing.

8 Claims, 9 Drawing Figures

VEHICLE LAMP CASING OPTICAL AXIS ADJUSTING MECHANISM

BACKGROUND OF THE INVENTION

1. Field of the Invention

The present invention relates generally to a mechanism for adjusting the optical axis of a lamp casing for a vehicle and particularly to a mechanism of this type in which the lamp casing is swingingly moved directly by linear movement of an operating wire so that the optical axis of the lamp casing can be accurately and surely adjusted in accordance with the control from a control device without being affected by working and fastening errors produced in the mechanism and so that there is scanty the possibility that the operation of the mechanism is rendered impossible by interposition of a foreign matter.

2. Description of the Prior Art

A conventional mechanism for adjusting the optical axis of, for example, a head lamp of a vehicle is generally constructed and arranged as shown in FIG. 1 of the accompanying drawings and includes a lamp casing 10 swingably supported by a hinge joint 11, a bell crank lever 12 swingably supported at a fulcrum and operatively connected at one arm to the lamp casing 10, an operating rod 13 operatively connected to the other arm of the bell crank lever 12, and a control device 14 operatively connected to the operating rod 13 through an operating wire 15 and a lever 16 for manually or automatically adjusting the angle of irradiation of a lamp in the lamp casing 10. As a result, in the conventional optical axis adjusting mechanism, an operating force effected to the operating rod 13 by the control device 14 is transmitted to the lamp casing 10 by way of the bell crank lever 12 by which linear movement of the operating rod 13 is converted to swinging movement of the bell crank lever 12. Thus, the conventional optical axis adjusting mechanism has had disadvantages that, when errors are produced in the working and fastening of the bell crank lever 12, the angular position of the lamp casing 10 can not be accurately adjusted in accordance with the control from the control device 14, and that the bell crank lever 12 is locked by interposition of a foreign matter to render the operation of the optical axis adjusting mechanism impossible. Furthermore, there has been existent an inconvenience that the provision of the bell crank lever 12 renders the working, fastening and assembling of the optical axis adjusting mechanism difficult and complicates the construction of the mechanism.

SUMMARY OF THE INVENTION

It is, therefore, an object of the invention to provide a lamp casing optical axis adjusting mechanism which is able to accurately and smoothly adjust the angular position or optical axis of a lamp casing in accordance with the control from a control device without being affected by working and fastening errors of component elements and in which there is scanty the possibility that the operation of the mechanism is rendered impossible by interposition of a foreign matter.

The object is accomplished by urging in one direction by an elastic body the lamp casing swingably supported by support means, by directly connecting an operating wire to the lamp casing for directly angularly moving same by linear movement of the operating wire in opposition to the biasing force of the elastic body, and by providing rotatable means for converting the direction of linear movement of the operating wire to the direction of angular movement of the lamp casing.

BRIEF DESCRIPTION OF THE DRAWINGS

This and other features and advantages of the invention will become more apparent from the following detailed description taken in connection with the accompanying drawings in which.

DESCRIPTION OF THE PREFERRED EMBODIMENTS

Figure 1:
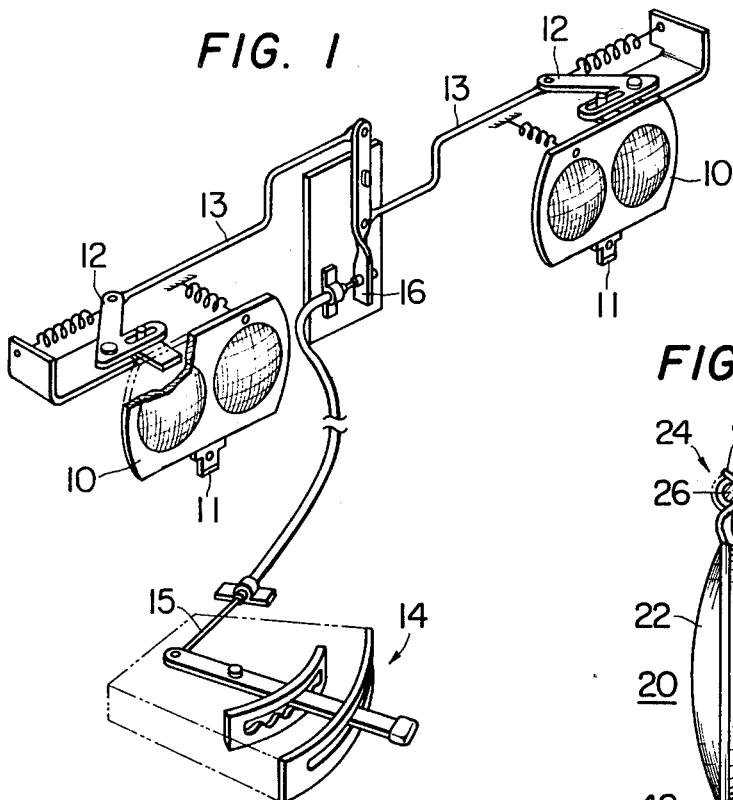
FIG. 1 is a schematic view of a conventional lamp casing optical axis adjusting mechanism for a vehicle as per the introduction of the present specification.
Figure 2A:
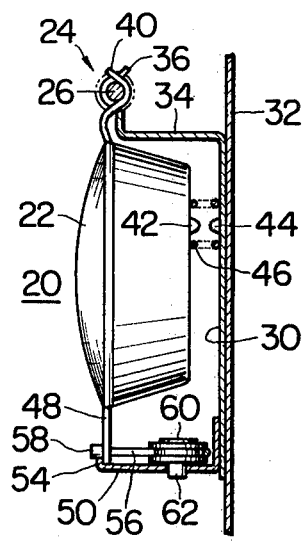
FIGS. 2(a) to 2(c) are schematic views of a first preferred embodiment of a vehicle lamp casing optical axis adjusting mechanism according to the invention.
Figure 2B:
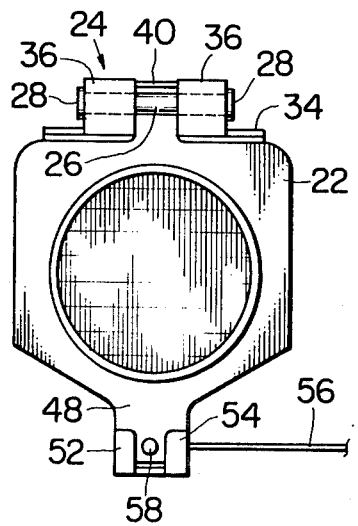
Figure 2C:
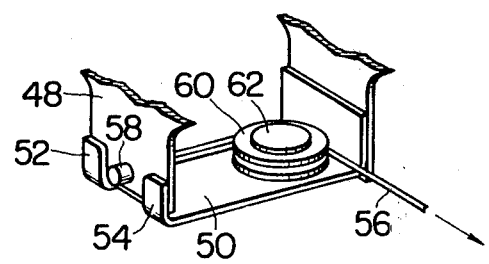

Referring to FIGS. 2(a), 2(b) and 2(c) of the drawings, there is shown a lamp casing optical axis adjusting mechanism according to the invention for a vehicle. The lamp casing optical axis adjusting mechanism, generally designated by the reference numeral 20, comprises a lamp casing 22 having a lamp (not shown) fixedly mounted therein. The lamp casing 22 is swingably supported by support means 24 which is formed of a hinge in this embodiment. The hinge 24 comprises a shaft 26 having heads 28 at both ends, respectively as shown in FIG. 2(b), and a base or support frame 30 for connecting the hinge 24 to the vehicle. The support frame 30 is fixedly secured to a body structure 32, such as a panel, of the vehicle by suitable fastening means (not shown) and has at an upper portion thereof a bracket 34 in the form of about a character L which extends forward or leftwards in the drawing as shown in FIG. 2(a). The bracket 34 has two flanges 36 extending upwards in the drawing and spaced from each other. The flanges 36 both are wound around the shaft 26 to embrace and support same. The hinge 24 also comprises a flange 40 extending upwards from an upper portion of the lamp casing 22. The flange 40 is interposed between the flanges 36 and is pivotably wound around the the shaft 26 so that the lamp casing 22 is supported by the shaft 26 swingingly movably around the axis of the shaft 26. The lamp casing 22 and the support frame 30 are located with respect to each other so that locating projections 42 and 44 formed respectively on the lamp casing 22 and the support frame 30 confront each other.

A compression spring 46 is interposed between the lamp casing 22 and the support frame 30 as shown in FIG. 2(a) to urge the lamp casing 22 swingingly around the axis of the shaft 26 leftwards or away from the support frame 30 in this embodiment. A flange 48 extends from a lower portion of the lamp casing 22 downwards in the drawing as shown in FIGS. 2(a) and 2(b). A bracket 50 is fixedly secured by suitable fastening means such as welding to and extends leftwards from a lower portion of the support frame 30 and has two stops 52 and 54 bent upwards and spaced from each other. The stops 52 and 54 both are located leftwards of the flange 48 of the lamp casing 22 and are engageable by the flange 48 for limiting the maximum angular position of the lamp casing 22 when the lamp casing 22 is swinged leftwards. An operating wire 56 is operatively connected at one end 58 to the flange 48 for pulling the lamp casing 22 rightwards or toward the support frame 30 in opposition to the force of the spring 46. The end 58 of the operating wire 56 is located, for example, between the stops 52 and 54 when the flange 48 is engaged therewith. A rotatable means 60 is provided which is, at a part of its circumferential portion, in friction contact with the operating wire 56 for turning the direction of movement of the operating wire 56, for example, perpendicular to the direction of movement of the lamp casing 22. The rotatable means 60 comprises a pulley mounted on the bracket 50 rotatably around the axis of a shaft 62 in this embodiment.

Figure 3A:
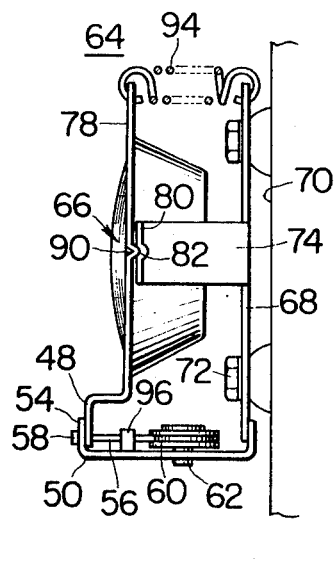
FIGS. 3(a) and 3(b) are schematic views of a second preferred embodiment of a vehicle lamp casing optical axis adjusting mechanism according to the invention.
Figure 3B:
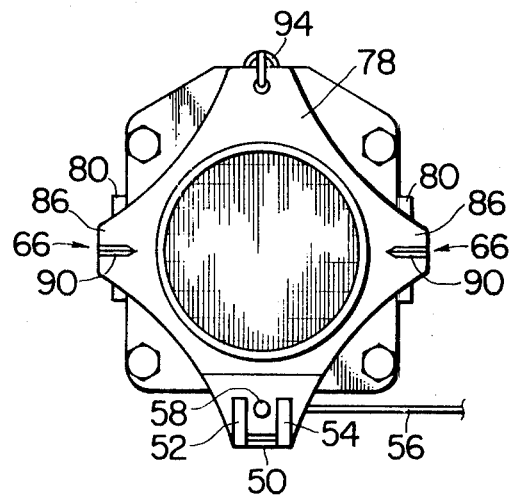

Referring to FIGS. 3(a) and 3(b) of the drawings, there is shown a lamp casing optical axis adjusting mechanism according to the invention which is generally designated by the reference numeral 64 and is characterized by the use of support means 66 different from the support means 24 of the lamp casing optical axis adjusting mechanism 20 shown in FIGS. 2(a) to 2(c). In FIGS. 3(a) and 3(b), like component elements are designated by the same reference numerals as those used in FIGS. 2(a) to 2(c). As shown in FIGS. 3(a) and 3(b), the support means 66 comprises a base or support frame 68 for connecting the support means 66 to the vehicle. The support frame 68 is fixedly secured to a body structure 70 of the vehicle by suitable fastening means 72 such as, for example, bolts and has first and second brackets 74 extending forward or leftwards in the drawing for swingably supporting a lamp casing 78 at a location spaced from the support frame 68. The brackets 74 are oriented respectively on both sides of about a center of the lamp casing 78 and have first and second flanges 80 which both are bent and extend laterally of the lamp casing 78 or parallel with the support frame 68 and externally or away from the lamp casing 78. The first and second flanges 80 are formed respectively with first and second recesses or grooves 82 which both are in the form of a character V and are concave toward the support frame 68. The lamp casing 78 has at both sides thereof first and second flanges 86 both extending laterally of the lamp casing 78 and away from the lamp casing 78 and confronting the first and second flanges 80, respectively. The first and second flanges 86 are formed respectively with first and second projections 90 which both are in the form of a character V and are convex toward the support frame 68. The first and second projections 90 are swingably received in or engaged with the first and second recesses 82 of the brackets 74, respectively for swingable supporting the lamp casing 78 by the first and second flanges 80.

An elastic member 94 such as a tension spring is interposed between an upper portion of the lamp casing 78 and the support frame 68 for holding the projections 90 received in the recesses 82, respectively and for urging the lamp casing 78 in opposite directions swingingly around the recesses 82. The end 58 of the operating wire 56 is operatively connected to a lower portion of the lamp casing 78 similarly to the lamp casing optical axis adjusting mechanism 20 shown in FIGS. 2(a) to 2(c) for pulling the lamp casing 78 toward the support frame 68 by the operating wire 56 in opposition to the action of the spring 94 and for moving the lamp casing 78 away from the support frame 68 by the force of the spring 94, swingingly around the recesses 82. The brackets 74 are interposed between the elastic member 94 and the operating wire 56. A pair of stops 96 are fixedly secured to the bracket 50 for limiting the maximum angular position of the lamp casing 78 when the lamp casing 78 is swinged toward the support frame 68. Since the operating wire 56 and the spring 94 are connected respectively to the lamp casing 78 on lower and upper sides of a center of the lamp casing 78 and the lamp casing 78 is supported on both lateral sides by the brackets 74 so that the lamp casing 78 is supported at four points, the lamp casing 78 is surely mounted on the vehicle, for example, the lamp casing 78 is at all times stable to vibrations due to travelling of the vehicle. Furthermore, since the radius of swinging movement of the lamp casing 78 is relatively small, it is possible to make the displacement of the operating wire 56 small.

Figure 4A:
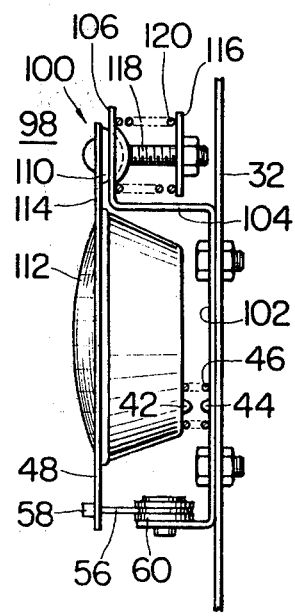
FIGS. 4(a) and 4(b) are schematic views of a third preferred embodiment of a vehicle lamp casing optical axis adjusting mechanism according to the invention.
Figure 4B:
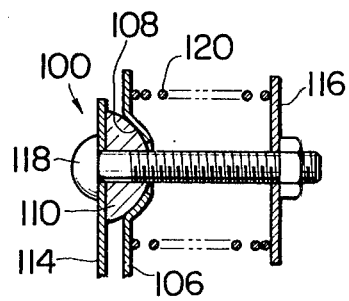

Referring to FIGS. 4(a) and 4(b) of the drawings, there is shown a lamp casing optical axis adjusting mechanism according to the invention which is generally designated by the reference numeral 98 and is characterized by the use of support means 100 different from the support means 24 and 66 of the lamp casing optical axis adjusting mechanisms 20 and 64 thus far described. In FIGS. 4(a) and 4(b), like component elements are designated by the same reference numerals as those used in FIGS. 2(a) to 2(c). As shown in FIGS. 4(a) and 4(c), the support means 100 comprises a base or support frame 102 for connecting the support means 100 to the vehicle. The support frame 102 is fixedly secured to the body structure 32 of the vehicle by suitable fastening means such as, for example, bolts and nuts (no numeral) and has at an upper portion thereof a bracket 104 in the form of about a character L which extends forward or leftwards in the drawing. The bracket 104 has a flange 106 extending upwards in the drawing. The flange 106 has a recess portion in the form of a bowl or a hollow segmental sphere which defines therein a recess 108 having an internal segmental spherical bearing surface so that the recess portion forms a bearing or socket. A spacer 110 in the form of a segmental sphere is slidably received in the recess 108 of the flange 106 and has an external segmental spherical surface which is in friction contact with the internal spherical bearing surface of the recess 108, and a circular or circumferential portion located externally of the recess 108. A lamp casing 112 has a flange 114 extending upwards and in contact with the circular portion of the spacer 110. A spring seat 116 is interposed between the recess portion of the flange 106 and the body structure 32. A rod 118 such as, for example, a bolt is provided to pass from the flange 114 toward the body structure 32 through apertures formed respectively through the flange 114, the spacer 110, the recess portion of the flange 106 and the spring seat 116. A stop 119 such as, for example, a nut is fixedly secured to the rod 118 between the spring seat 116 and the body structure 32 for limiting movement of the spring seat 116 away from the recess portion. A spring 120 is interposed between the flange 106 and the spring seat 116 for urging same in opposite directions to press the flange 114 and the spacer 110 against the spacer 110 and the bearing surface of the recess portion of the flange 106, respectively so that the lamp casing 112 is swingingly supported by and moved around the bearing surface of the recess portion. The lamp casing 112 is urged leftward by the spring 46 and is pulled rightwards by the operating wire 56 in opposition to the force of the spring 46, similarly to the lamp casing optical axis adjusting mechanism 20 of FIGS. 2(a) to 2(c).

In the lamp casing optical axis adjusting mechanism 98 thus described, since the flange 114 and the spacer 110 are pressed against the recess portion of the flange 106 by the force of the spring 120, no play is produced between the elements 114, 110 and 106. Furthermore, the durability of the flange 106 and the spacer 110 is increased by employing a good wear resisting material for the flange 106 and the spacer 110.

Figure 5:
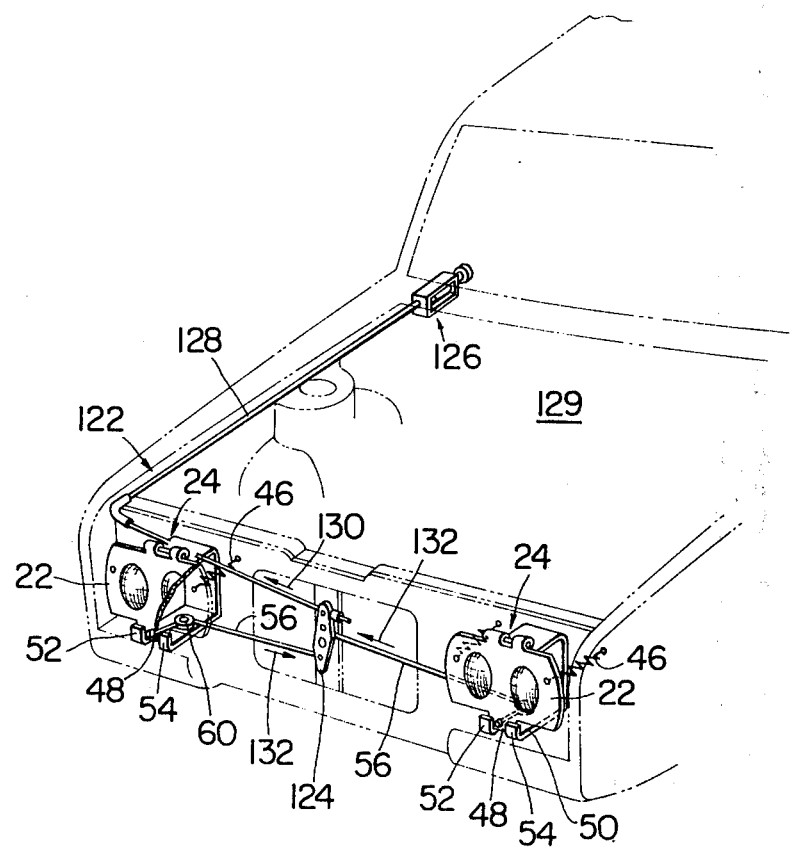
FIG. 5 is a schematic view of control means employed common to the three mechanisms shown in FIGS. 2(a) to 2(c), FIGS. 3(a) and 3(b) and FIGS. 4(a) and 4(b).

Referring to FIG. 5 of the drawings, there is shown control means 122 for manually or automatically adjusting the angular position or optical axis of the lamp casings 22, 78 and 112 by the will of the driver (not shown) of the vehicle. The control means 122 is common to the lamp casing optical axis adjusting mechanisms 20, 64 and 98 thus far described and comprises a lever 124 operatively connected to the operating wire 56, and a control device 126 operatively connected to the lever 124 through a driving wire 128 for angularly driving the lever 124 in opposite directions around a fulcrum by the will of the driver for causing movements of the operating wire 56 in opposite directions. In FIG. 5, there is shown a vehicle 129 equipped with the lamp casing optical axis adjusting mechanism 20 of FIG. 2(a) to 2(c) as an example.

The operation of the lamp casing optical axis adjusting mechanism 20 as one example is described with respect to FIGS. 2(a) to 2(c) and 5 hereinafter.

When it is desired to adjust the optical axis of the lamp casing 22 downwards, the control device 126 is moved to pull the driving wire 128 in the direction shown by the arrow 130 in FIG. 5 and the lever 124 is rotated counterclockwise in the drawing by the driving wire 128 to pull the operating wire 56 in the direction shown by the arrow 132 in FIG. 5. As a result, the lamp casing 22 is angularly moved toward the vehicle 129 around the axis of the shaft 26 in opposition to the force of the spring 46. In this instance, the direction of movement of the operating wire 56 in the direction of the arrow 132 is changed by the pully 60 to the direction of angular movement of the lamp casing 22. Furthermore, the optical axis of the lamp casing 22 is accurately adjusted downwards by an angle corresponding to the displacement of the control device 126 by a slight operating or driving force, since the driver is not almost resisted by a frictional force in driving the control device 126.

When it is desired to adjust the optical axis of the lamp casing 22 upwards, since the driving wire 128 is urged by the force of the spring 46 in the direction opposite to the arrow 130, the lamp casing 22 is angularly moved away from the vehicle 129 around the axis of the shaft 26 by the force of the spring 46 by allowing the driving wire 128 to be moved in the direction opposite to the arrow 130. In this instance, the lamp casing 22 can be swinged upwards until the flange 48 is engaged against the stops 52 and 54.

As described above, since the optical axis adjusting mechanisms 20, 64 and 98 are constructed and arranged such that the operating wire 56 is moved in opposite directions together with rotation of the pulley 60, there is extremely rare the possibility of the pulley 60 being locked due to entrance of a foreign matter so that the optical axis of the lamp casing can be accurately and surely adjusted.

Even if it is rendered impossible for the pulley 60 to be rotated due to entry of a foreign matter or occurrence of any other trouble, since the operating wire 56 is slidably moved along a groove of the pulley 60 to effect change in the direction of linear movement of the operating wire 56 and to cause angular movement of the lamp casings 22, 78 and 112 similarly to normal operation in which the pulley 60 can be rotated, there is almost no risk that the function of adjusting the lamp casing optical axis is lost.

Although the invention has been described such that each of the support means 24 and 100 and the biasing means 94 is located above the operating wire 56 and the pulley 60, the location of each of the support means 24 and 100 and the biasing means 94 and the location of the operating wire and the pulley can be changed to each other.

Since the optical axis adjusting mechanism according to the invention has various constructions as described above, it is desirable to select optimum one of the constructions in accordance with an object equipped with the optical axis adjusting mechanism.

It will be appreciated that the invention provides a lamp casing optical axis adjusting mechanism in which an operating wire is directly and operatively connected to a lamp casing for angularly moving same by linear movement of the operating wire and a pulley is provided for changing the direction of linear movement of the operating wire to the direction of angular movement of the lamp casing so that the operating wire can transmit to the lamp casing an operating force and a displacement given from a control device to the operating wire almost without causing loss, and so that, since the lamp casing is angularly moved directly by the operating wire, the angular movement of the lamp casing becomes extremely smooth and accordingly a result is obtained that the optical axis of the lamp casing can be accurately and smoothly adjusted. Furthermore, since a bell crank level is omitted, the working of the mechanism is facilitated and the construction of the mechanism is simplified.

What is claimed is:

1. A lamp casing optical axis adjusting mechanism for a vehicle, comprising:

a lamp casing;

a support frame adapted to be connected to a vehicle;

means defining a recess having a spherical concave bearing surface;

spherical means having a spherical convex surface and received in said recess in a condition in which said bearing and convex surfaces are in sliding contact with each other;

means for retaining said spherical means and said recess in said condition;

means for connecting said lamp casing and said support frame to said recess defining means and said spherical means so that said lamp casing is swingably supported by said support frame;

biasing means for swingingly urging said lamp casing in one direction;

an operating wire operatively connected to said lamp casing for effecting swinging movement of said lamp casing in another direction opposite to said one direction in opposition to the force of said biasing means; and rotatable means supported by said support frame and in friction contact with said operating wire for changing the direction of movement of said operating wire to the direction of swinging movement of said lamp casing.

2. A lamp casing optical axis adjusting mechanism for a vehicle, comprising:

a lamp casing;

a support frame adapted to be connected to a vehicle;

means which defines a recess having a spherical concave bearing surface and which is connected to said support frame;

spherical means having a spherical convex surface and connected to said lamp casing, said spherical means being received in said recess in a condition in which said bearing and convex surfaces are in slidable contact with each other for swingably supporting said lamp casing;

biasing means for swingingly urging said lamp casing in one direction;

an operating wire operatively connected to said lamp casing for effecting swinging movement of said lamp casing in another direction opposite to said one direction in opposition to the force of said biasing means; and rotatable means supported by said support frame and in friction contact with said operating wire for changing the direction of movement of said operating wire to the direction of swinging movement of said lamp casing.

3. A lamp casing optical axis adjusting mechanism for a vehicle, comprising a lamp casing, support means for swingably supporting said lamp casing, biasing means for swingingly urging said lamp casing in one direction, an operating wire operatively connected to said lamp casing for effecting swinging movement of said lamp casing in another direction opposite to said one direction in opposition to the force of said biasing means, and rotatable means in friction contact with said operating wire for changing the direction of movement of said operating wire to the direction of swinging movement of said lamp casing, in which said support means comprises a support frame for connecting said support means to a body structure of a vehicle, said support frame having a recess portion defining therein a recess which has an internal segmental spherical bearing surface, a spacer having an external segmental spherical bearing surface which is in sliding contact with said internal segmental spherical bearing surface, a flange extending from said lamp casing and in contact with a circular portion of said spacer, and means for retaining said spacer and said flange in contact with said recess portion and said spacer respectively for supporting said lamp casing swingably with respect to said recess portion.

4. A lamp casing optical axis adjusting mechanism as claimed in claim 3, in which said rotatable means comprises a pulley for changing the direction of movement of said operating wire perpendicular to the direction of swinging movement of said lamp casing.

5. A lamp casing optical axis adjusting mechanism as claimed in claim 3, in which said retaining means comprises a spring seat spaced from said recess portion, a rod extending through apertures formed respectively through both said flange and said spacer and said recess portion and said spring seat, a stop for limiting movement of said spring seat away from said recess portion, and a spring interposed between said recess portion and said spring seat for urging same in opposite directions.

6. A lamp casing optical axis adjusting mechanism for a vehicle, comprising:

a lamp casing;

a shaft;

a support frame adapted to be connected to a vehicle;

a flange extending from said support frame and wound around said shaft for supporting same;

a flange extending from an upper portion of said lamp casing and wound around said shaft for supporting said lamp casing swingably around the axis of said shaft;

a compression spring for urging said lamp casing in one direction swingingly around said axis of said shaft;

an operating wire operatively connected to a lower portion of said lamp casing for effecting swinging movement of said clamp casing around said axis of said shaft in another direction opposite to said one direction in opposition to the force of said compression spring; and rotatable means supported by said support frame and in friction contact with said operating wire for changing the direction of movement of said operating wire to the direction of said swinging movement of said lamp casing.

7. A lamp casing optical axis adjusting mechanism for a vehicle, comprising:

a lamp casing;

a support frame adapted to be connected to a vehicle;

first means connected to said support frame and formed with a first groove;

second means connected to said support frame and formed with a second groove;

third means connected to said lamp casing and formed with a first projection;

fourth means connected to said lamp casing and formed with a second projection;

said first and second projections being swingably received respectively in said first and second grooves for swingably supporting said lamp casing;

a tension spring connected to an upper portion of said lamp casing and to said support frame for urging said lamp casing in one direction for maintaining said first and second projections in a condition received in said first and second grooves respectively;

an operating wire operatively connected to a lower portion of said lamp casing for effecting swinging movement of said lamp casing in another direction opposite to said one direction in opposition to the force of said tension spring;

said first groove and said first projection being located at one side of said lamp casing and between said tension spring and said operating wire;

said second groove and said second projection being located at the other side of said lamp casing and between said tension spring and said operating wire; and rotatable means supported by said support frame and in friction contact with said operating wire for changing the direction of movement of said operating wire to the direction of swinging movement of said lamp casing.

8. A lamp casing optical axis adjusting mechanism as claimed in claim 7, in which said first and second means comprises first and second brackets both projecting from said support frame and oriented respectively on both sides of said lamp casing, said first and second brackets having first and second flanges which extend laterally of said lamp casing and away from said lamp casing and are formed respectively with said first and second grooves, said first and second grooves being both concave toward said support frame, and said third and fourth means comprises third and fourth flanges laterally extending respectively from both sides of said lamp casing and confronting said first and second flanges, respectively and formed respectively with said first and second projections, said first and second projections being both convex toward said support frame, said brackets being interposed between said tension spring and said operating wire.

* * * * *